(12) United States Patent
Mori

(10) Patent No.: US 10,408,240 B2
(45) Date of Patent: Sep. 10, 2019

(54) SHOCK ABSORBER AND VALVE MEMBER

(71) Applicant: SHOWA CORPORATION, Gyoda (JP)

(72) Inventor: Nobuo Mori, Gyoda (JP)

(73) Assignee: SHOWA CORPORATION, Gyoda, Saitama (JP)

( * ) Notice: Subject to any disclaimer, the term of this patent is extended or adjusted under 35 U.S.C. 154(b) by 1594 days.

(21) Appl. No.: 13/801,448

(22) Filed: Mar. 13, 2013

(65) Prior Publication Data

US 2014/0060315 A1    Mar. 6, 2014

(30) Foreign Application Priority Data

Aug. 30, 2012  (JP) .................................. 2012-190365

(51) Int. Cl.
*F16F 9/00*       (2006.01)
*B60G 13/00*    (2006.01)
*F15B 15/00*    (2006.01)

(52) U.S. Cl.
CPC .............. *F15B 15/00* (2013.01); *B60G 13/00* (2013.01); *F16F 9/00* (2013.01); *B60G 2202/24* (2013.01)

(58) Field of Classification Search
CPC ................................... B60G 13/08; F16F 9/18
USPC ................. 188/266.4, 266.5, 282.1
See application file for complete search history.

(56) References Cited

U.S. PATENT DOCUMENTS 5,332,069 A * 7/1994 Murakami ............ F16F 9/3484
188/282.6

FOREIGN PATENT DOCUMENTS

| JP | U1975153384 | | 8/1975 |
|---|---|---|---|
| JP | H02-076937 | A | 3/1990 |
| JP | H03-000340 | A | 1/1991 |
| JP | 2009-299768 | A | 12/2009 |
| JP | 2010-164120 | A | 7/2010 |
| JP | 2011-069443 | A | 4/2011 |

OTHER PUBLICATIONS

Translation of Japanese Patent Publication 2011-069443.*

* cited by examiner

*Primary Examiner* — Michael Leslie
*Assistant Examiner* — Daniel S Collins
(74) *Attorney, Agent, or Firm* — Leason Ellis LLP

(57) ABSTRACT

An object of the present invention is to facilitate discharge of foreign matter present around a valve member, while inhibiting degradation of seal performance of the valve member. A shock absorber includes a cylinder portion containing a liquid, a piston valve partitioning a space in the cylinder portion into a first oil chamber and a second oil chamber which contain oil, a piston rod connected to the piston valve and moving in an axial direction of the cylinder portion, a piston nut 43 (cylinder portion 433) forming a channel for the liquid between the first oil chamber and the second oil chamber, and a float valve 52 deformed or displaced depending on the pressure of oil in the channel in the piston nut 43 to open and close the channel. The float valve 52 for the channel member includes a projecting portion 52P and a recessed portion 52M so that, with the position of the float valve 52 adjusted, a gap is formed between the float valve 52 and the piston nut 43 (cylinder portion 433).

2 Claims, 9 Drawing Sheets

FIG.2A
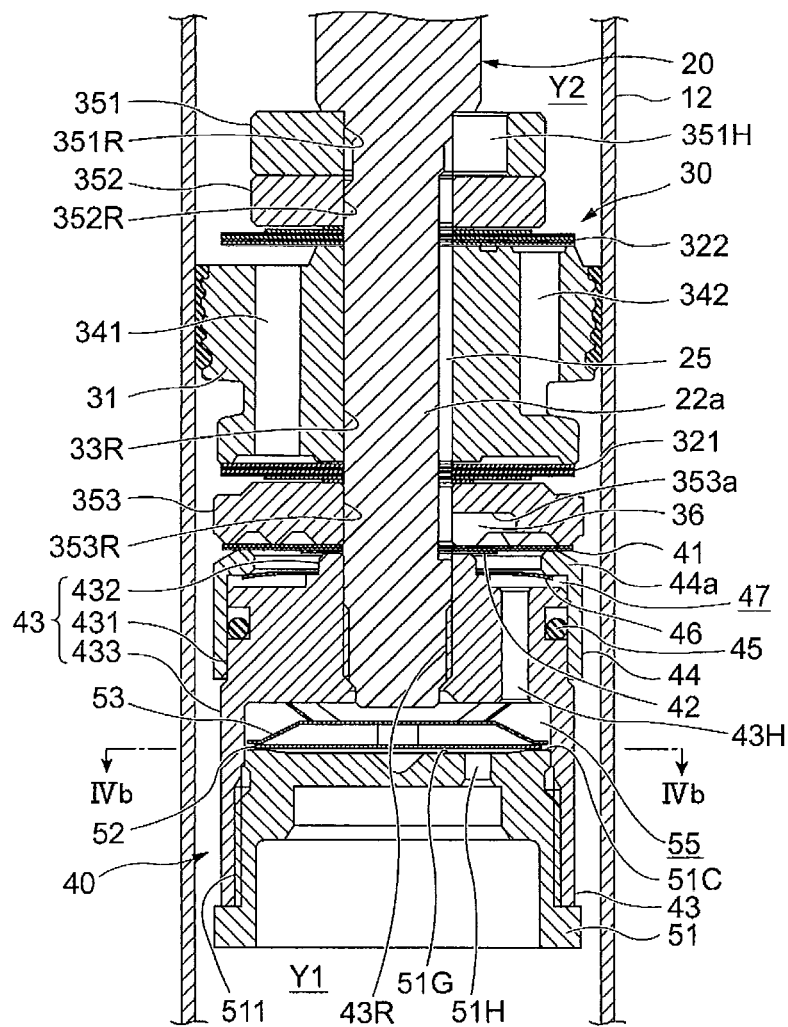
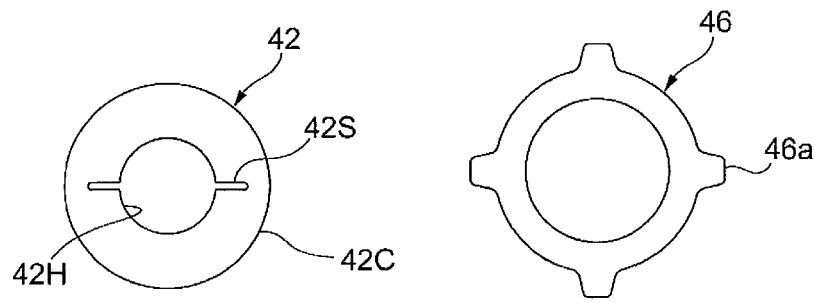
FIG.2B    FIG.2C

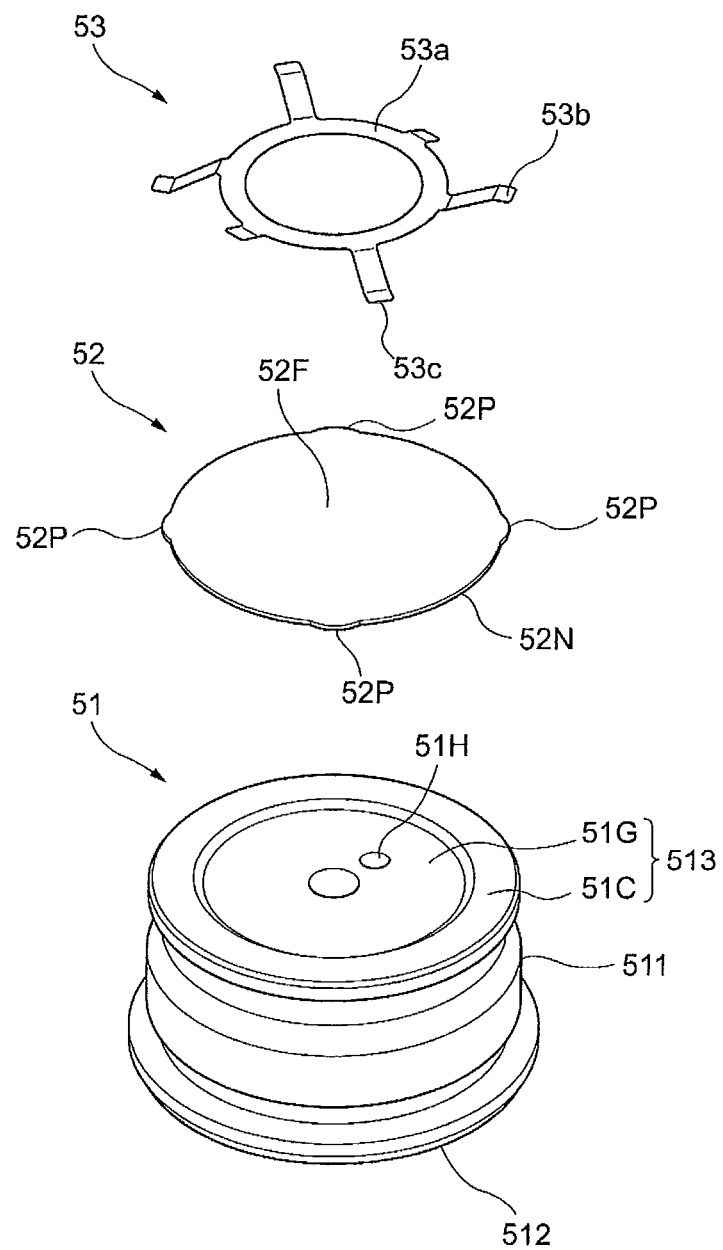

SHOCK ABSORBER AND VALVE MEMBER

CROSS REFERENCE TO RELATED APPLICATIONS

This application is based on and claims priority under 35 USC § 119 from Japanese Patent Application No. 2012-190365 filed Aug. 30, 2012.

BACKGROUND OF THE INVENTION

1. Field of the Invention

The present invention relates to a shock absorber and a valve member.

2. Description of the Related Art

A suspension apparatus in a vehicle such as an automobile includes a shock absorber with a damping force generator in order to appropriately reduce vibration transmitted from a road surface to a vehicle body during traveling, thus improving ride comfort and steering stability. In a known shock absorber as descried above, a displaceable and deformable valve member is arranged on a liquid channel in a cylinder containing a liquid, to release or cut off a flow of the liquid.

For example, Japanese Patent Application Laid-Open No. 2011-69443 proposes a shock absorber including a damping force adjusting mechanism to increase a damping force in a low-frequency range, while reducing the damping force in a high-frequency range. In the damping force adjusting structure in Japanese Patent Application Laid-Open No. 2011-69443, a displaceable and deformable valve member is provided in a channel for a flow of a liquid so as to form a pressure chamber, thus adjusting the damping force.

[Patent Literature 1] Japanese Patent Application Laid-Open Publication No. 2011-069443

SUMMARY OF THE INVENTION

In the shock absorber, if the displaceable and deformable valve member is provided in the channel in the cylinder, for example, foreign matter attached to the components or contained in the liquid may be trapped between the valve member and the channel.

An object of the present invention is to facilitate discharge of foreign matter present around the valve member while inhibiting the seal performance of the valve member from being degraded.

To accomplish this object, the present invention provides a shock absorber including a cylinder containing a liquid, a partitioning member partitioning a space in the cylinder into a first liquid chamber and a second liquid chamber which contain the liquid, a rod member connected to the partitioning member and moving in an axial direction of the cylinder, a channel member forming a channel for the liquid between the first liquid chamber and the second liquid chamber, and a valve member deformed or displaced depending on a pressure of the liquid in the channel of the channel member to open and close the channel, wherein, in a state where a position of the valve member is adjusted with respect to the channel member, a gap is formed between the valve member and the channel member.

Here, the gap is formed such that an interval between an inner periphery of the channel member and an outer periphery of the valve member is formed to be equal to a first distance, and the position of the valve member is adjusted such that the interval is formed to be equal to a second distance shorter than the first distance.

Furthermore, the valve member includes a projecting portion projecting outward from an outer periphery of the valve member, and the gap is formed between the valve member and the channel member in a state where the position of the valve member is adjusted with respect to the channel member by the projecting portion.

The apparatus further includes a bypass path extending from the first liquid chamber to the second liquid chamber, and a pressure chamber communicating with the bypass path via a throttle member provided in the bypass path to throttle a channel, and the valve member is deformed or displaced to change a volume in the pressure chamber.

Additionally, in another aspect, the preset invention provides a valve member that is provided in a channel for a liquid between a first liquid chamber and a second liquid chamber into which a cylinder of a shock absorber is partitioned, and that obstructs or releases a flow of the liquid through the channel, the valve member including a deformation portion provided in a center of the valve member and deformed under a pressure of the liquid, and a projecting portion provided around an outer periphery of the deformation portion and projecting outward from the outer periphery.

The present invention facilitates discharge of foreign matter present around the valve member while inhibiting the seal performance of the valve member from being degraded.

BRIEF DESCRIPTION OF THE DRAWINGS

FIG. 2A is a diagram illustrating the hydraulic shock absorber in detail;

FIG. 2B is a diagram showing a disc valve of the hydraulic shock absorber of FIG. 2A;

FIG. 2C is a diagram showing a support spring of the hydraulic shock absorber of FIG. 2A;

FIG. 3 is a diagram illustrating a damping force adjusting section;

DESCRIPTION OF THE PREFERRED EMBODIMENTS

An embodiment of the present invention will be described below with reference to the attached drawings.

Figure 1:
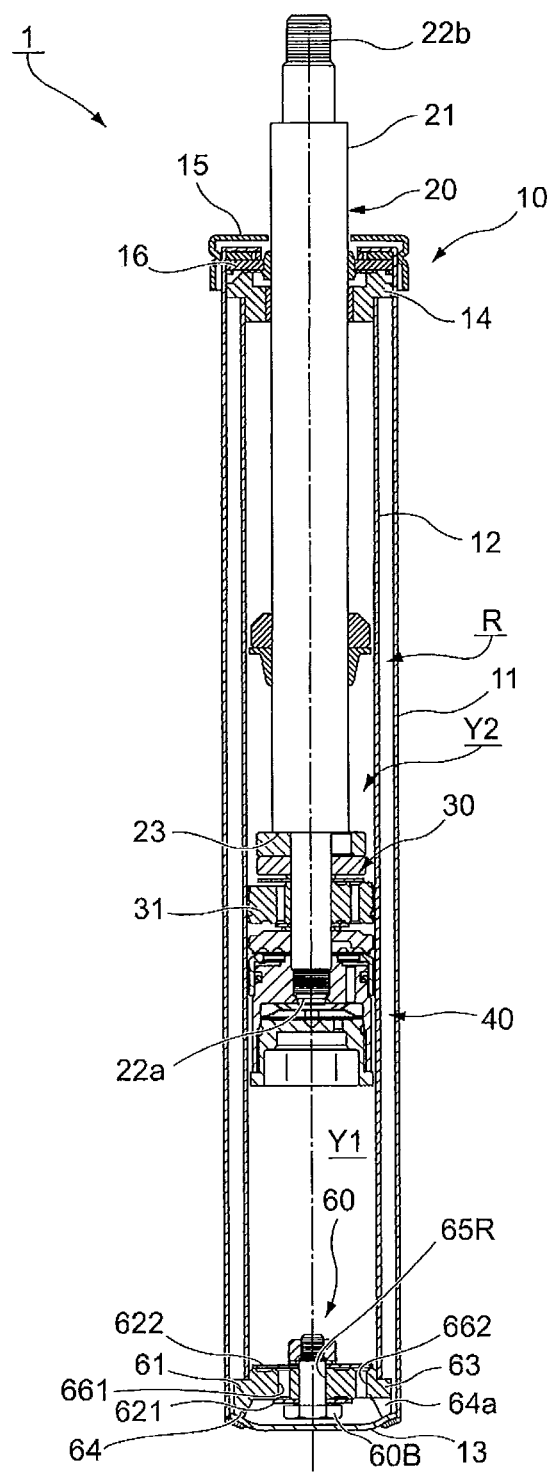
FIG. 1 is a diagram of a general configuration of a hydraulic shock absorber according to the present embodiment.

FIG. 1 is a diagram of a general configuration of a hydraulic shock absorber 1 according to the present embodiment.

FIG. 2 is a diagram illustrating the hydraulic shock absorber 1 in detail.

As shown in FIG. 1, the hydraulic shock absorber 1 as an example of a shock absorber is a multi-tube hydraulic shock absorber forming a part of a frequency responding suspension. The hydraulic shock absorber 1 includes a cylinder portion 10, a piston rod 20 serving as an example of a rod member, a piston valve 30 serving as an example of a partitioning member, a damping adjusting section 40, and a bottom valve 60.

[Configuration and Functions of the Cylinder Portion]

The cylinder portion 10 includes an outer cylinder 11 shaped like a thin cylinder, an inner cylinder 12 contained in the outer cylinder 11 and also shaped like a thin cylinder, and a bottom cover 13 covering a first end portion of the cylindrical outer cylinder 11 in an axial direction of the cylinder (in FIG. 1, in an up-down direction). The direction of the center axis of the outer cylinder 11 is hereinafter simply referred to as the "axial direction".

The cylinder portion 10 also includes a rod guide 14 which guides the piston rod 20 arranged inside the outer cylinder 11, and a bump stopper cap 15 allowing the piston rod 20 to slide and installed at a second axial end portion of the outer cylinder 11. The cylinder portion 10 further includes an oil seal 16 provided inside the bump stopper cap 15 opposite a piston 31 with respect to the rod guide 14 to prevent leakage of a liquid from inside of the cylinder portion 10 and mixture of foreign matter in the cylinder portion 10.

In the cylinder portion 10, the outer cylinder 11 is longer than the inner cylinder 12 in the axial direction. The inner cylinder 12 is arranged concentrically with the outer cylinder 11. That is, a first axial end portion of the inner cylinder 12 is supported by the first end portion of the outer cylinder 11 via a bottom cover 13 and a valve body 61 described below, which is a component forming a bottom valve 60.

On the other hand, a second axial end portion of the inner cylinder 12 is supported by the rod guide 14. Thus, the inner cylinder 12 is arranged concentrically with the outer cylinder 11 so as to make the gap between an outer periphery of the inner cylinder 12 and an inner periphery of the outer cylinder 11 constant in the axial direction. An outer peripheral surface of the inner cylinder 12 and an inner peripheral surface of the outer cylinder 11 form a reservoir chamber R. As shown in FIG. 1, the bottom valve 60 is configured such that the valve body 61 described below separates a first oil chamber Y1 from the reservoir chamber R.

[Configuration and Functions of the Piston Rod]

The piston rod 20 extends in the axial direction and connects to the piston rod 30 and a damping adjusting section 40 at a first axial end portion (in FIG. 1, a lower end portion) of the piston rod 30.

The piston rod 20 is a solid or hollow bar-like member and has a columnar or cylindrical rod section 21, a first-side attachment section 22a located at a first axial end portion of the piston rod 20 and to which the piston valve 30, the damping force adjusting section 40, and the like are attached, and a second-side attachment section 22b located at a second axial end portion of the piston rod 20 and allowing the piston rod 20 to be attached to a vehicle body or the like. An external thread is formed, by spiral grooving, on an outer surface of an end portion of each of the first-side attachment section 22a and the second-side attachment section 22b.

Furthermore, the first-side attachment section 22a has a smaller outer diameter than the rod section 21. Thus, the first-side attachment section 22a forms a step 23 at a point where the first-side attachment section 22a is connected to the rod section 21. Moreover, the piston rod 20 includes a bypass path 25 which is a groove-like path formed in the first-side attachment section 22a so as to extend in the axial direction and allowing oil to flow between a second oil chamber Y2 and the first oil chamber Y1.

[Configuration and Functions of the Piston Valve]

As shown in FIG. 2A, the piston valve 30 includes the piston 31, a first valve group 321 which covers a first axial end portion of each of some of a plurality of oil passages formed in the piston 31, and a second valve group 322 which covers a second axial end portion of each of some of the plurality of oil passages formed in the piston 31. Furthermore, the piston valve 30 includes a first valve stopper 351, a second valve stopper 352, and a third valve stopper 353.

The piston 31 is a cylindrical member with the plurality of oil passages formed therein in the axial direction. The piston 31 contacts an inner peripheral surface of the inner cylinder 12 via a seal member provided on an outer peripheral surface of the piston 31, to partition a space in the inner cylinder 12 in which a liquid (in the present embodiment, oil) is sealed, into the first oil chamber Y1 located closer to the first axial end portion of the inner cylinder 12 than the piston 31 and the second oil chamber Y2 closer to the second axial end portion of the inner cylinder 12 than the piston 31 (see FIG. 1).

The piston 31 includes a mounting hole 33R formed therein in the axial direction to allow the first-side attachment section 22a of the piston rod 20 to pass through, a first oil passage 341 formed in an area radially outside the mounting hole 33R so as to extend in the axial direction, and a second oil passage 342 formed in an area radially outside the first oil passage 341 so as to extend in the axial direction. A plurality of (in the present embodiment, four) the first oil passages 341 and a plurality of (in the present embodiment, four) the second oil passages 342 are formed at regular intervals in a circumferential direction of the piston 31 to allow the first oil chamber Y1 and the second oil chamber Y2 to communicate with each other.

The first valve group 321 includes a plurality of stacked discs each with a bolt hole formed therein and through which the first-side attachment section 22a of the piston rod 20 is threaded. The individual valves forming the first valve group 321 are set so as to close the first oil passages 341 while opening the second oil passages 342.

The second valve group 322 includes a plurality of stacked discs each with a bolt hole formed therein and through which the first-side attachment section 22a of the piston rod 20 is threaded. The individual valves forming the second valve group 322 are set so as to close the second oil passages 342 while opening the first oil passages 341.

Each of the first valve stopper 351 and the second valve stopper 352 are generally shaped like a cylinder. The first valve stopper 351 and the second valve stopper 352 include a mounting hole 351R and a mounting hole 352R, respectively, which extend in the axial direction and which have an inner diameter allowing the first-side attachment section 22a of the piston rod 20 to penetrate the mounting holes 351R and 352R. The first valve stopper 351 further has a communication hole 351H formed adjacent to the mounting hole 351R and similarly communicating with the mounting hole 351R in the axial direction.

In the first valve stopper 351 and the second valve stopper 352, the first-side attachment section 22a is fitted in the mounting hole 351R, and the second valve group 322 is sandwiched between the piston 31 and both the first valve stopper 351 and the second valve stopper 352. Furthermore, the communication hole 351H in the first valve stopper 351 is open to the second oil chamber Y2 on a first axial side of the communication hole 351H, and faces the bypass path 25 formed in the piston rod 20 and positioned inside the second valve stopper 352 on a second axial side of the communication hole 351H.

The third valve stopper 353 is generally shaped like a cylinder. The third valve stopper 353 has a mounting hole 353R extending in the axial direction and having an inner diameter allowing the first-side attachment section 22a of the piston rod 20 to penetrate the mounting hole 353R. The third valve stopper 353 further has a recessed portion 353a which is open toward a damping force varying valve 41 described below.

In the third valve stopper 353, the first-side attachment section 22a is fitted in the mounting hole 353R, and the first valve group 321 is sandwiched between the piston 31 and the third valve stopper 353. Furthermore, the recessed portion 353a of the third valve stopper 353 forms a discharge passage 36 which is a space communicating with the bypass path 25.

[Configuration and Functions of the Damping Force Adjusting Section]

As shown in FIG. 2A, the damping force adjusting section 40 has the damping force varying valve 41, an orifice 42 serving as an example of a throttle member, a piston nut 43 serving as an example of a channel member, a spool 44, and a support spring 46. The damping force adjusting section 40 further has an end portion cap 51, a float valve 52 serving as an example of a valve member, and a pressure adjusting chamber spring 53.

The damping force varying valve 41 closes an opening of the discharge passage 36 while covering the recessed portion 353a of the third valve stopper 353. When deformed to stop covering the recessed portion 353a, the damping force varying valve 41 opens the discharge passage 36 to allow oil in the second oil chamber Y2 to flow to the first oil chamber Y1 through the bypass path 25 and the discharge passage 36. That is, the bypass path 25 functions as a pressure relief passage for the pressure of the oil in the second oil chamber Y2. The damping force varying valve 41 functions as a liquid pressure relief valve.

As shown in FIG. 2B, the orifice 42 is shaped like a disc valve and has an opening 42H formed in a central portion thereof and penetrated by the first-side attachment section 22a of the piston rod 20. The orifice 42 also includes a slit 42S cut therein so as to extend from an inner peripheral surface of an annular portion 42C enclosing the opening 42H to a position closer to an outer periphery of the annular portion 42C. The orifice 42, together with the damping force varying valve 41, is sandwiched between a first oil chamber Y1-side end portion of the third valve stopper 353 and an annular projecting portion 432 (described below) of the piston nut 43. In this case, a leading end portion side of the slit 42S extends radially outward beyond the annular projecting portion 432 (described below) so as to communicate with a pressure chamber 47 (described below). Furthermore, a base end portion of the slit 42S is in communication with a lower end portion of the bypass path 25.

According to the present embodiment, the slit 42S is formed in at least one area in the circumferential direction. However, the number of the slits 42S and the length and width of the slit 42S can be set as appropriate according to a relevant specification.

The piston nut 43 has a cylindrical portion 431, the annular projecting portion 432 provided at a first axial end portion of the cylindrical portion 431, and an annular projecting portion 433 provided at a second axial end portion of the cylindrical portion 431.

The cylindrical portion 431 has a bolt hole 43R which is a through-hole extending in the axial direction and in which the first-side attachment section 22a of the piston rod 20 is fitted, and a communication passage 43H formed adjacent to the bolt hole 43R so as to penetrate the cylindrical portion 431 from the annular projecting portion 432 to a cylinder portion 433. According to the present embodiment, a plurality of the communication passages 43H are provided in a circumferential direction of the piston nut 43.

With the first-side attachment section 22a fixed in the bolt hole 43R, the piston nut 43 is supported by the piston rod 20. According to the present embodiment, the bolt hole 43R in the piston nut 43 is mounted over the first-side attachment section 22a. Thus, the piston nut 43 allows the piston valve 30 and the damping force adjusting section 40, which are disposed between the piston nut 43 and the step 23, to be sandwiched between the piston nut 43 and the step 23 of the piston rod 20. The piston nut 43 thus allows these members to be held by the piston rod 20.

Furthermore, the communication passage 43H allows the pressure chamber 47 and a pressure adjusting chamber 55 both described below to communicate with each other to form a oil channel between the pressure chamber 47 and the pressure adjusting chamber 55.

The bypass path 25 in the piston rod 20, the pressure chamber 47, the communication passage 43H, the cylinder portion 433 (pressure adjusting chamber 55), and a through-hole 51H (described below) in the end portion cap 51 form one oil channel between the second oil chamber Y2 and the first oil chamber Y1. Oil flows through this channel depending on the operation of the piston valve 30 as described below.

The spool 44 is generally shaped like a cylinder. The spool 44 has an upper end portion 44a shaped like an inward flange and bent toward the axis at an opening located at a first end of the spool 44, with a second end of the spool 44 fitted externally over the cylindrical portion 431 of the piston nut 43. An O ring 45 is provided between the spool 44 and the cylindrical portion 431. The spool 44 is mounted so as to be movable in the axial direction with respect to the cylindrical portion 431 of the piston nut 43.

Furthermore, the upper end portion 44a of the spool 44 is formed so as to be able to contact the damping force varying valve 41 at a first axial end of the upper end portion 44a and so as to contact the support spring 46 described below at a second end of the upper end portion 44a. The spool 44 is biased toward the piston nut 43 by the support spring 46 described below to press the damping force varying valve 41 against an end portion of the piston nut 43.

As shown in FIG. 2A, a space enclosed by the upper end portion 44a of the spool 44, the annular projecting portion 432 of the piston nut 43, and the damping force varying valve 41 form the pressure chamber 47.

As shown in FIG. 2C, the support spring 46 is shaped like a ring and includes a plurality of projecting portions 46a formed at an outer peripheral portion of the support spring 46 so as to project in an externally radial direction. The support spring 46 is supported at an inner peripheral portion thereof by the annular projecting portion 432 of the piston nut 43. As shown in FIG. 2A, the support spring 46 brings the projecting portions 46a into contact with the upper end portion 44a of the spool 44 to hold the spool 44 so that the spool 44 is movable in the axial direction.

FIG. 3 is a diagram illustrating the damping force adjusting section 40.

The end portion cap 51 is a member shaped like a cylinder as shown in FIG. 3. The end portion cap 51 includes a side surface portion 511, a first-side end portion 512, and a second-side end portion 513.

The side surface portion 511 of the end cap 51 has an outer diameter set equivalent to the inner diameter of the cylinder portion 433 of the piston nut 43. The end cap 51 is fitted into the cylinder portion 433 of the piston nut 43. In this case, a thread (not shown) formed on an outer periphery of the side surface portion 511 is fitted to a thread (not shown) formed on an inner periphery of the cylinder portion 433 to fix the end cap 51.

The end cap 51 fitted into the cylinder portion 433 of the piston nut 43 forms the pressure adjusting chamber 55, which is a space between the second-side end portion 513 and the cylinder portion 433. As shown in FIG. 2A, the pressure adjusting chamber 55 contains the float valve 52 and the pressure adjusting chamber spring 53.

As shown in FIG. 3, the second-side end portion 513 of the end cap 51 includes an annular portion 51C formed along a circular edge so as to project in the axial direction and a deformation regulating section 51G provided inside the annular portion 51C in the radial direction and formed of a step-like recessed portion lower than the annular portion 51C in the axial direction.

The annular portion 51C allows an outer edge of the float valve 52 to be sandwiched between the annular portion 51C and the pressure adjusting chamber spring 53 described below. Furthermore, when the float valve 52 is deflected, the deformation regulating section 51G forms a gap which accepts this amount of deformation as long as the amount falls within a predetermined range, as described below.

Moreover, the end cap 51 includes the through-hole 51H which penetrates the end cap 51 from the second-side end portion 513 toward the first-side end portion 512. The through-hole 51H is in communication with the pressure adjusting chamber 55 on a first side of the through-hole 51H and faces the first oil chamber Y1 on a second side of the through-hole 51H (see FIG. 2A).

As shown in FIG. 3, the float valve 52 is a leaf spring shaped like a disc. The float valve 52 has an elastic deflection portion 52F located in a central portion thereof and deflected in a curved manner under the pressure of oil. The float valve 52 according to the present embodiment also has a projecting portion 52P projecting radially outward from an outer peripheral portion of the float valve 52 and a recessed portion 52N recessed toward the center of the float valve 52 with respect to the projecting portion 52P.

The float valve 52 contacts the annular portion 51C of the end cap 51 at an outer peripheral portion thereof and is biased toward the end cap 51 by the pressure adjusting chamber spring 53. The float valve 52 can move against the bias force of the pressure adjusting chamber spring 53 described below. The float valve 52 is displaced in the axial direction and in a direction orthogonal to the axial direction. Moreover, when the float valve 52 is pressurized in contact with the annular portion 51C of the end cap 51, the elastic deflection portion 52F in the central portion of the float valve 52 is deformed until the elastic deflection portion 52F comes into contact the deformation regulating section 51G.

As described above, the float valve 52 is deformed or displaced during a tension stroke and a compression stroke to change the volume of the pressure adjusting chamber 55. The float valve 52 also closes the through-hole 51H in the end cap 51 to cut off a flow of oil between the pressure adjusting chamber 55 and the first oil chamber Y1, or releases the flow of oil.

As shown in FIG. 3, the float valve 52 according to the present embodiment also has the projecting portion 52P projecting radially outward from the outer peripheral portion of the float valve 52 and the recessed portion 52N recessed inward in the radial direction with respect to the projecting portion 52P. The projecting portion 52P is provided in a plurality of (in the present embodiment, four) areas. The projecting portions 52P are arranged at regular intervals in the circumferential direction. The recessed portion 52N is formed between the projecting portions 52P adjacent to each other in the circumferential direction.

Figure 4A:
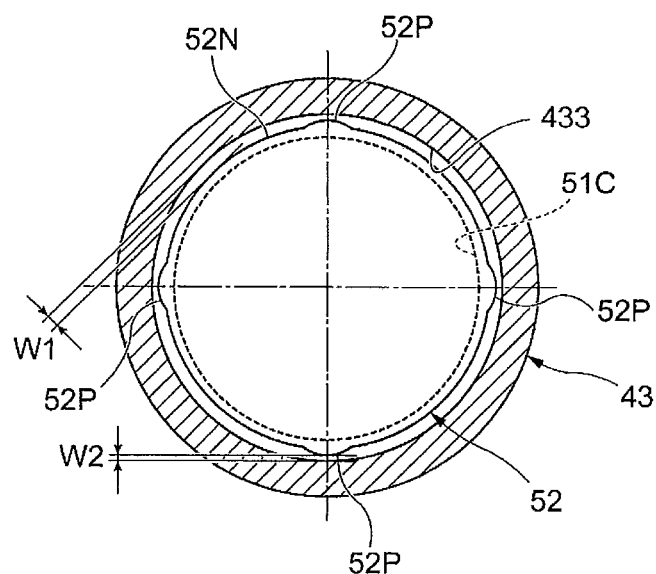
FIGS. 4A and 4B are diagrams illustrating shapes of a float valve.
Figure 4B:
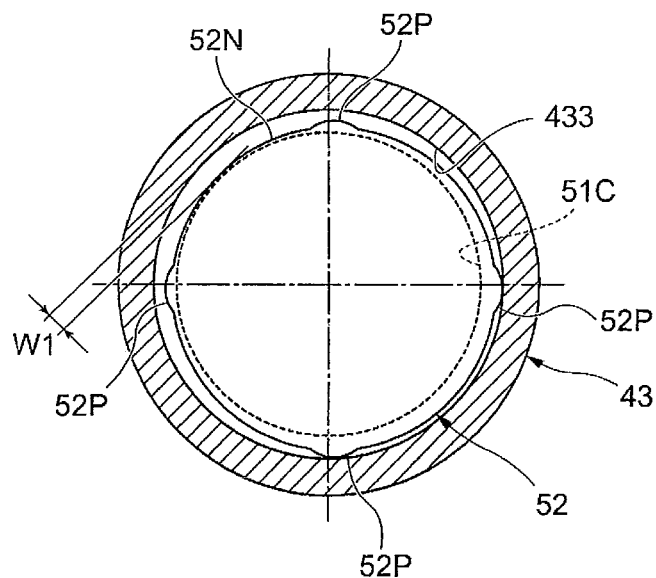

FIGS. 4A-4B are diagrams illustrating alternative shapes of the float valve.

With the float valve 52 provided on the piston nut 43, the distance of the gap between an outer periphery of each of the recessed portions 52N and an inner periphery of the cylinder portion 433 (hereinafter "recessed portion gap W1") is larger than the distance of the gap between an outer periphery of each of the projecting portions 52P and the inner periphery of the cylinder portion 433 (hereinafter "projecting portion gap W2").

As shown in FIG. 4A, the recessed portions 52N are configured such that with the position of the center of the float valve 52 coinciding with the position of the cylindrical center of the cylinder portion 433, the recessed portion gap W1 is, for example, 0.7 mm. The distance of the recessed portion gap W1 is set based on, for example, the distance that foreign matter (contaminants) can pass through, as described below.

Furthermore, the projecting portions 52P are configured such that with the position of the center of the float valve 52 coinciding with the position of the cylindrical center of the cylinder portion 433, the projecting portion gap W2 is, for example, 0.2 mm. As described above, the float valve 52 moves (is displaced) in the cylinder portion 433 forming the pressure chamber 47 to open and close the oil channel during the tension stroke. Thus, the projecting portion gap W2 has a specific distance so as to make the float valve 52 movable with respect to the cylinder portion 433.

Here, as shown in FIG. 4B, the center of the float valve 52 may be displaced with respect to the cylindrical center of the cylinder portion 433, bringing a part of the float valve 52 into contact with cylinder portion 433. At this time, the inner periphery of the cylinder portion 433 is contacted by the projecting portions 52P projecting radially outward from the recessed portions 52N.

The projecting portions 52P function so that with the float valve 52 eccentric with respect to the cylindrical center of the cylinder portion 433, the recessed portion gap W1 of the portion of the float valve 52 which is not in contact with the cylinder portion 433 maintains a specific distance. The specific distance is set based on, for example, a distance which prevents any of the recessed portions 52N of the float valve 52 from falling into the inside of the annular portion 51C (toward the center axis of the annular portion 51C). In this manner, the projecting portions 52P adjust the maximum eccentricity of the float valve 52 with respect to the piston nut 43. If the float valve 52 becomes eccentric with respect to the cylinder portion 433, the projecting portions 52P function to enable maintenance of the capability of closing (sealing) the second-side end portion 513 of the end cap 51.

As described above, with the position of the float valve 52 with respect to the piston nut 43 (cylinder portion 433) adjusted, the present embodiment allows a gap with the predetermined distance (recessed portion gap W1) to be formed between the float valve 52 and the piston nut 43.

The present embodiment uses the circular float valve 52. Thus, providing the projecting portion 52P in at least three areas allows the eccentricity of the float valve 52 to be adjusted even if the float valve 52 becomes eccentric in any direction with respect to the cylinder portion 433. However, an excessive number of projecting portions 52P may degrade a function to discharge foreign matter described below. Thus, the number is preferably set to a given value.

Furthermore, the shape of the float valve 52 is not limited to a circle. For example, if the float valve 52 is shaped like an ellipse instead of a circle, the projecting portion 52P may be provided in two areas corresponding to longer circular-arc sides (sides of the ellipse located further from the cylinder portion 433).

According to the present embodiment, the float valve 52 is shaped like a circle, and the plurality of projecting portions 52P are arranged at regular intervals in the circumferential direction. This prevents the durability of the float valve 52 from being degraded by the biased contact of the float valve 52, which may occur when the float valve 52 is displaced in the radial direction of the cylinder portion 433, or a load imposed on the float valve 52 by stress concentration on the float valve 52 associated with the deformation thereof which may be caused by a possible non-uniform shape thereof.

As shown in FIG. 3, the pressure adjusting chamber spring 53 is a thin-plate annular spring and has a plate-like toric portion 53a, and a plurality of upward spring legs 53b and a plurality of downward spring legs 53c which are radially provided around an outer periphery of the plate-like annulus portion 53a. The upward spring legs 53b and the downward spring legs 53c are provided at regular intervals in a circumferential direction of the plate-like toric portion 53a. The upward spring legs 53b and the downward spring legs 53c are also arranged so as to extend alternately obliquely upward and downward from an outer periphery of the plate-like toric portion 53a.

The pressure adjusting chamber spring 53 is mounted with the upward sprig legs 53b arranged opposite an end portion surface of the cylinder portion 433 of the piston nut 43 so that the downward spring legs 53c support the float valve 52 so as to press the float valve 52 against the annular portion 51C of the end cap 51.

[Configuration and Functions of the Bottom Valve]

As shown in FIG. 1, the bottom valve 60 includes a valve body 61 with a plurality of oil passages formed therein in the axial direction, a first valve 621 which closes a first axial end of each of some of the plurality of oil passages formed in the valve body 61, a second valve 622 which closes a second axial end of each of some of the plurality of oil passages formed in the valve body 61, and a bolt 60B which fixes these members.

The valve body 61 has a disc-like portion 63 shaped like a disc and a cylindrical portion 64 shaped like a cylinder and extending in the axial direction from the outermost portion of the disc-like portion 63. The valve body 61 thus defines a closed space in the cylinder portion 10.

The disc-like portion 63 includes a bolt hole 65R formed therein in the axial direction and through which a shaft portion of the bolt 60B is threaded, a first oil passage 661 formed in an area radially outside the bolt hole 65R so as to extend in the axial direction, and a second oil passage 662 formed in an area radially outside the first oil passage 661 so as to extend in the axial direction. A plurality of (in the present embodiment, four) the first oil passages 661 and a plurality of (in the present embodiment, four) the second oil passages 662 are formed at regular intervals in a circumferential direction of the disc-like portion 63. The first oil passages 661 and the second oil passages 662 thus function as communication passages which allow the first oil chamber Y1 and the reservoir chamber R to communicate with each other.

The cylindrical portion 64 has a plurality of (in the present embodiment, four) recessed portions 64a formed on a first axial end portion side thereof at regular intervals in a circumferential direction thereof; the recessed portions 64a are recessed from the end surface on the first axial end portion side. The recessed portions 64a allow the inside of the cylindrical portion 64 and the reservoir chamber R to communicate with each other.

The first valve 621 is a disc-like member with a bolt hole formed therein and through which the shaft portion of the bolt 60B is threaded. The first valve 621 has an outer diameter with a size set to close the first oil passage 661 and open the second oil passage 662.

The second valve 622 is a disc-like member with a bolt hole formed therein and through which the shaft portion of the bolt 60B is threaded. The second valve 622 has an outer diameter with a size set to close the second oil passage 662. The second valve also includes a plurality of (in the present embodiment, nine) oil holes formed at regular intervals in a circumferential direction of the second valve at positions corresponding to the first oil passages 661 as viewed from the radial center of the second valve.

Now, the operation of the hydraulic shock absorber 1 according to the present embodiment will be described.

First, the operation of the piston valve 30 and the bottom valve 60 during the compression stroke and the tension stroke will be described.

Figure 5:
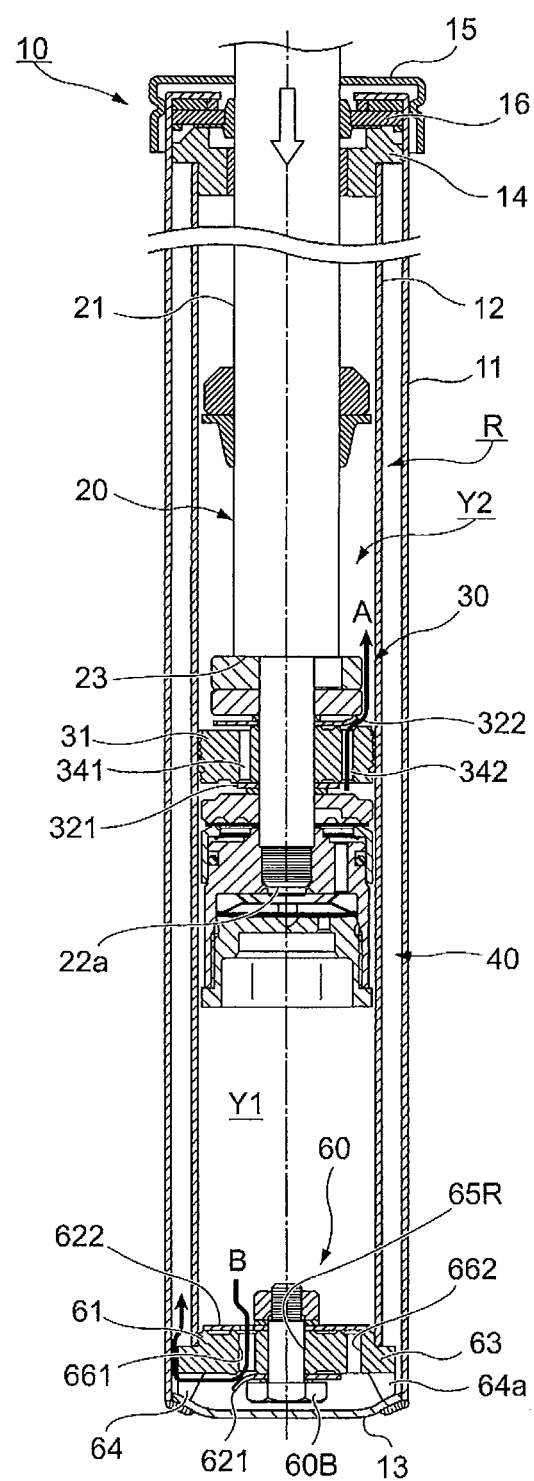
FIG. 5 is a diagram showing a flow of oil during a compression stroke.

FIG. 5 is a diagram showing a flow of oil during the compression stroke.

As shown in FIG. 5, when the piston 31 moves toward the first axial end portion side (in FIG. 5, downward) with respect to the cylinder portion 10 as shown by a blank arrow, the movement of the piston 31 pushes the oil in the first oil chamber Y1 to raise the pressure on the lower side of the piston valve 30, exerting an elevated pressure on the second oil passage 342 in the piston valve 30. As a result, the second valve group 322 closing the second oil passage 342 is opened to allow the oil to flow through the second oil passage 342 into the second oil chamber Y2, located above the piston valve 30, as shown by arrow A in FIG. 5. The flow of the oil from the first oil chamber Y1 to the second oil chamber Y2 is throttled by the second valve groove 322 and the second oil passage 342 to exert a damping force for the compression stroke of the hydraulic shock absorber 1.

Furthermore, the pressure in the first oil chamber Y1 elevated by the movement of the piston 31 toward the first axial end portion side acts on the first oil passage 661 in the bottom valve 60 to open the first valve 621 closing the first oil passage 661. Then, the oil in the first oil chamber Y1 flows through the first oil passage 661 and recessed portion 64a in the valve body 61 into the reservoir chamber R formed between the inner cylinder 12 and the outer cylinder 11 as shown by arrow B in FIG. 5. The flow of the oil from the first oil chamber Y1 to the reservoir chamber R is throttled by the first valve 621 and the first oil passage 661 to exert a damping force for the compression stroke of the hydraulic shock absorber 1.

Figure 6:
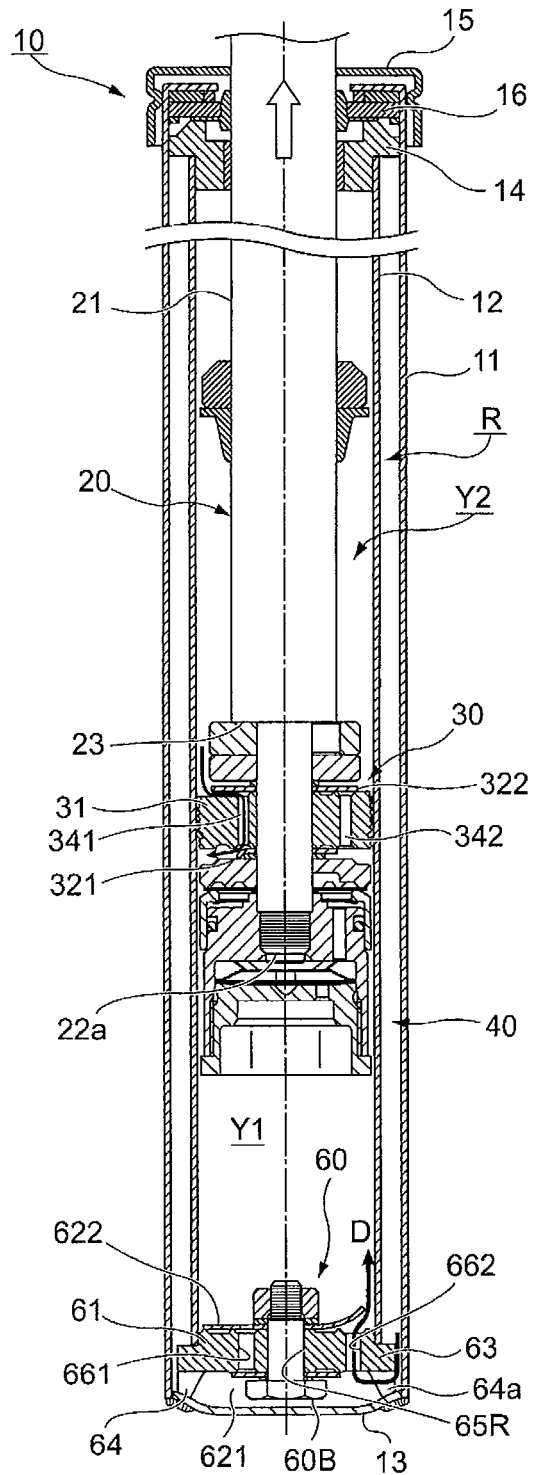
FIG. 6 is a diagram showing the flow of oil during a tension stroke.

FIG. 6 is a diagram showing a flow of oil during the tension stroke.

As shown in FIG. 6, when the piston 31 moves toward the second axial end portion side (in FIG. 6, upward) with respect to the cylinder portion 10 as shown by a blank arrow, the first oil chamber Y1 runs short of the corresponding amount of oil and is subjected to negative pressure. Thus, the oil in the second oil chamber Y2 flows through the first oil passage 341 in the piston valve 30 to open the first valve group 321 closing the first oil passage 341. The oil then flows into the first oil chamber Y1 as shown by arrow C in FIG. 6. The flow of the oil from the second oil chamber Y2 to the first oil chamber Y1 is throttled by the first valve group 321 and first oil passage 341 in the piston valve 30 to exert a damping force for the tension stroke of the hydraulic shock absorber 1.

Furthermore, when the piston 31 moves in the direction of the blank arrow in FIG. 6, the oil in the reservoir chamber R flows through the recessed portion 64a and second oil passage 662 in the valve body 61 of the bottom valve 60 to open the second valve 622 closing the second oil passage 662. The oil then flows into the first oil chamber Y1 as shown by arrow D in FIG. 6. The flow of the oil from the reservoir chamber R to the first oil chamber Y1 is throttled by the second valve 622 and second oil passage 662 in the bottom valve 60 to exert a damping force for the tension stroke of the hydraulic shock absorber 1.

Figure 7:
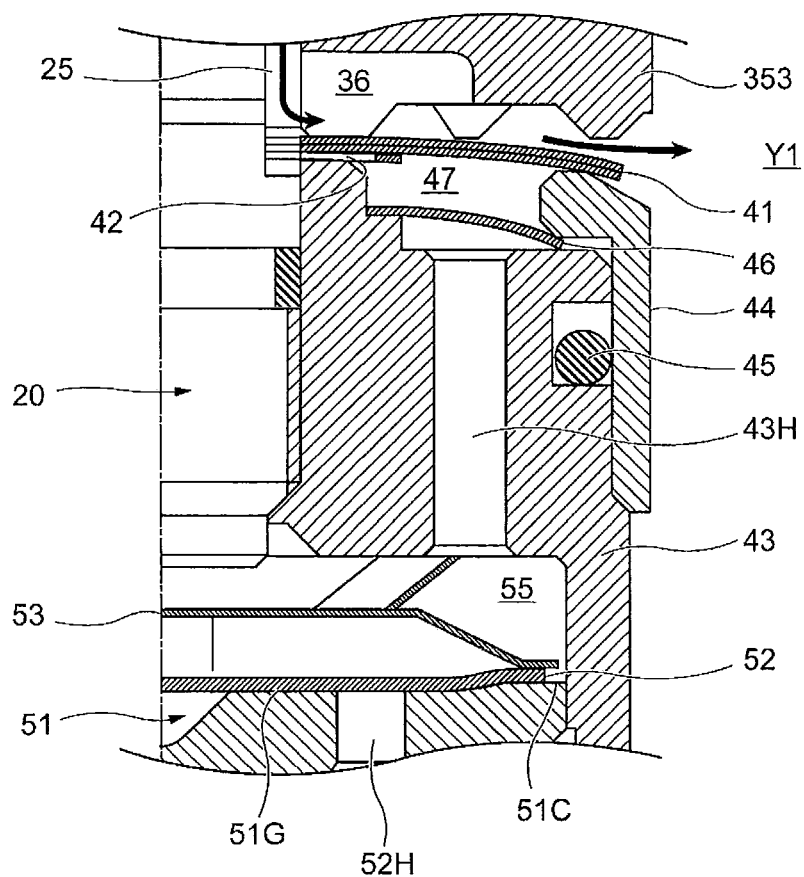
FIG. 7 is a diagram illustrating the operation of the damping force adjusting section during the tension stroke.

FIG. 7 is a diagram illustrating the operation of the damping force adjusting section 40 during the tension stroke.

During the tension stroke, in an area where the movement of the piston 31 (see FIG. 6) has a low frequency and a large amplitude, the pressure of the oil in the second oil chamber Y2 (see FIG. 6) is quickly transmitted to the pressure chamber 47 without being throttled down by the orifice 42. Thus, the pressure of the oil in the pressure chamber 47 is equal to the pressure in the second oil chamber Y2. As a result, the damping force varying valve 41 in the damping force adjusting section 40 remains closed.

Furthermore, the pressure adjusting chamber 55 is in communication with the pressure chamber 47 via the communication passage 43H. Thus, the float valve 52 is pushed in to set the pressure in the pressure adjusting chamber 55 equal to the pressure in the pressure chamber 47, preventing a possible decease in the hydraulic pressure in the pressure chamber 47.

On the other hand, in an area where the movement of the piston 31 (see FIG. 6) has a predetermined high frequency and a predetermined very small amplitude, the pressure of the second oil chamber Y2 (see FIG. 6) is throttled down by the orifice 42 in the bypass path 25 and delayed in transmission to the pressure chamber 47. Thus, the hydraulic pressure in the pressure chamber 47 is lower than the pressure of the oil in the second oil chamber Y2. This leads to a difference in pressure between the pressure chamber 47 and the second oil chamber Y2. As shown in FIG. 7, this pressure difference causes the damping force varying valve 41 to be pushed and opened to transfer the oil in the second oil chamber Y2 toward the first oil chamber Y1 via the bypass path 25.

As a result, the pressure of the oil in the second oil chamber Y2 is released to the first oil chamber Y1. Thus, the damping force of the hydraulic shock absorber 1 is reduced by the two channels, that is, the channel via the bypass 25 and the damping force varying valve 41 in addition to the channel via the second oil passage 342 and second valve group 322 in the piston valve 30.

Furthermore, the pressure in the pressure chamber 47 which has been kept low by the delay in pressure transmission caused by the orifice 42 subsequently acts to rise. At this time, as shown in FIG. 7, the float valve 52 in the pressure adjusting chamber 55 is pushed down to maintain the hydraulic pressure in the pressure chamber 47. Thus, the volume of the pressure chamber 47 substantially increases whereby a rise in the hydraulic pressure in the pressure chamber 47 is delayed. The delay is sustained until the float valve 52 comes into contact with the deformation regulating section 51G of the end cap 51.

Then, when the elastic deflection portion 52F of the float valve 52 comes into contact with the deformation regulating section 51G, the hydraulic pressure in the pressure chamber 47 rises rapidly. When the pressure difference between the second oil chamber Y2 and the pressure chamber 47 is eliminated, the spool 44 is pushed by the support spring 46 to close the damping force varying valve 41. Finally, only a path through which the oil migrates via the piston valve 30 works, thus increasing the damping force of the hydraulic shock absorber 1.

Figure 8:
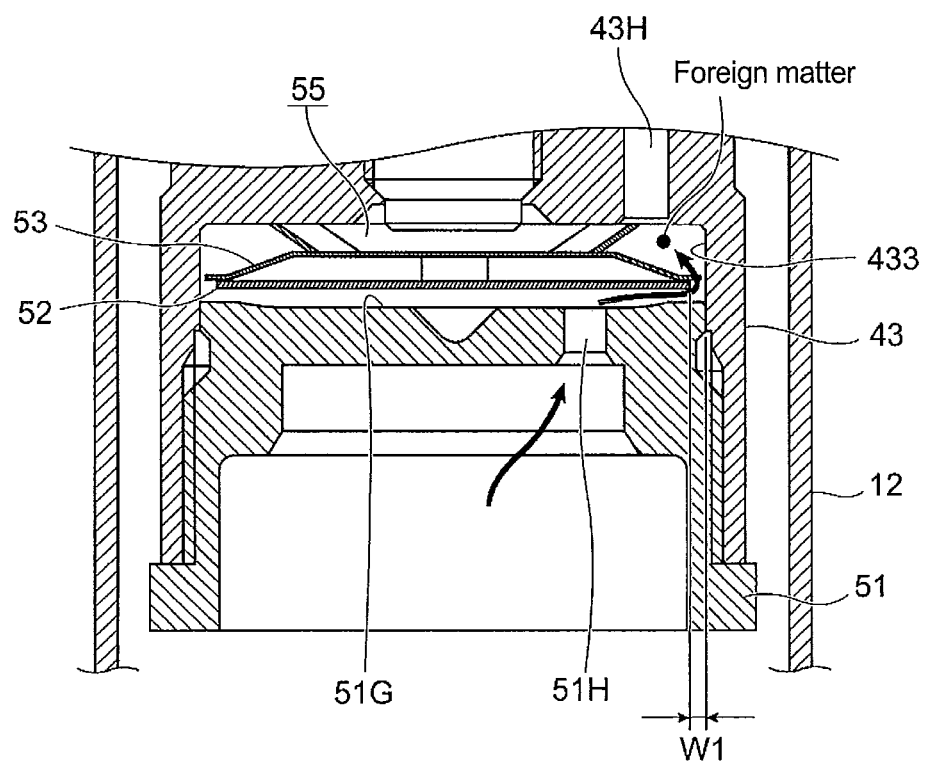
FIG. 8 is a diagram illustrating the operation of the damping force adjusting section during the compression stroke.

FIG. 8 is a diagram illustrating the operation of the damping force adjusting section 40 during the compression stroke.

During the compression stroke, the pressure in the first oil chamber Y1 increases above the pressure in the pressure adjusting chamber 55. Then, the oil from the first oil chamber Y1 flows into the pressure adjusting chamber 55 through the through-hole 51H formed in the end cap 51. At this time, the float valve 52 leaves the deformation regulating section 51G of the end cap 51 against the force of the pressure adjusting chamber spring 53.

The oil from the first oil chamber Y1 acts to flow toward the second oil chamber Y2 using a channel from the trough-hole 51H through the cylinder portion 433 (pressure adjusting chamber 55) of the piston nut 43 to the communication passage 43H.

Here, for some reason, foreign matter may be mixed into the oil and stuck in between the float valve 52 and end cap 51 of the damping force adjusting section 40 as shown in FIG. 8. In contrast, the present embodiment provides the projecting portions 52P and the recessed portions 52N on the float valve 52. Thus, the recessed portion gap W1 is formed between the float valve 52 and the cylinder portion 433 of the piston nut 43. Therefore, the foreign matter stuck in between the float valve 52 and the end cap 51 is discharged toward the pressure chamber 47 through the recessed portion gap W 1. For example, the foreign matter further migrates toward the second oil chamber Y2 at a predetermined timing during the tension stroke. The foreign matter is then discharged.

As described above, the hydraulic shock absorber 1 to which the present embodiment is applied exerts the following effect. Even if foreign matter is stuck in between the end cap 51 and the float valve 52, the foreign matter is inhibited from being trapped between the float valve 52 and the annular portion 51C or deformation regulating section 51G of the end cap 51.

Moreover, the present embodiment provides the projecting portions 52P on the float valve 52. Thus, even if the center of the float valve 52 is displaced from the cylindrical center of the cylinder portion 433 to make the float valve 52 eccentric (see FIG. 4B), the distance of the recessed portion gap W1 can be set within a given range. The present embodiment sets the recessed portion gap W1 corresponding to the maximum eccentricity equal to the value of a distance preventing the recessed portions 52N of the float valve 52 from slipping into the inside of the annular portion 51C of the end cap 51. Thus, the capability of providing a seal between the float valve 52 and the end cap 51 can be maintained.

Now, another example of the damping force adjusting section 40 will be described.

Figure 9A:
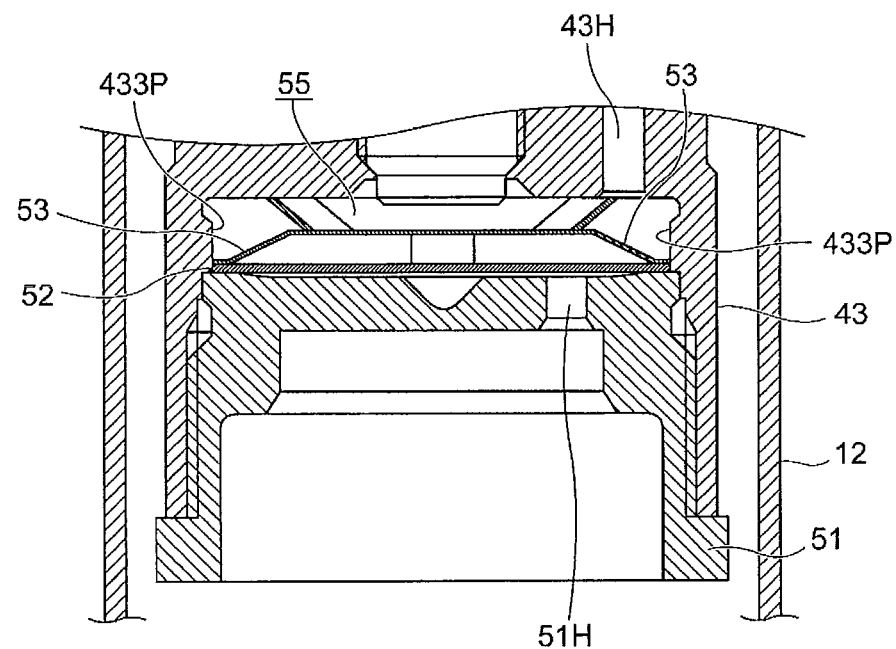
FIGS. 9A-9C are drawings illustrating another example of the damping force adjusting section.
Figure 9B:
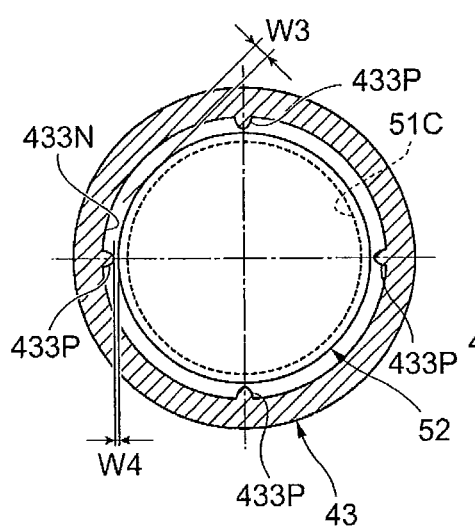
Figure 9C:
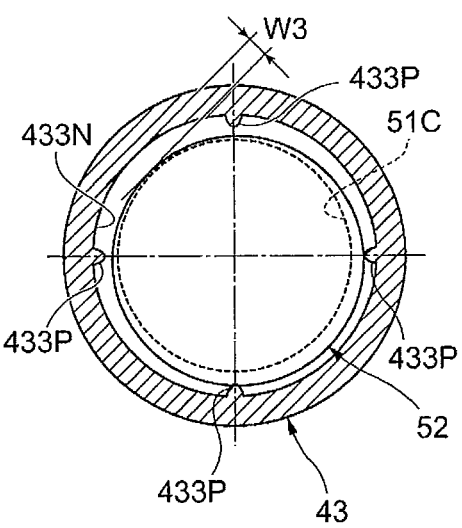

FIGS. 9A-9C are diagrams illustrating the damping force adjusting section 40 in this example.

As shown in FIG. 9A, the damping force adjusting section 40 in this example includes a projecting portion 433P formed on an inner peripheral surface of the cylinder portion 433 of the piston nut 43 so as to project toward the center of the damping force adjusting section 40 and a recessed portion 433N formed in a part of the inner peripheral surface in which the projecting portion 433P is not formed. As shown in FIG. 9B, the projecting portion 433P is provided in a plurality of (in this example, four) areas on the inner periphery of the cylinder portion 433. Furthermore, the plurality of projecting portions 433P are arranged at regular intervals in the circumferential direction. Moreover, the recessed portion 433N is positioned between the projecting portions 433P adjacent to each other in the circumferential direction of the cylinder portion 433.

Furthermore, in another example, the float valve 52 includes no projecting portion 52P (recessed portion 52N) formed thereon and is circular. The float valve 52 is contained inside the cylinder portion 433 of the piston nut 43.

With the float valve 52 provided in the piston nut 43, the gap between outer periphery of the float valve 52 and the inner periphery of each of the recessed portions 433N (hereinafter "recessed portion gap W3") is larger than the gap between outer periphery of the float valve 52 and the inner periphery of each of the projecting portions 433P (hereinafter "projecting portion gap W4").

As shown in FIG. 9B, the recessed portions 433N are configured such that with the position of the center of the float valve 52 coinciding with the position of the cylindrical center of the cylinder portion 433, the recessed portion gap W3 is, for example, 0.7 mm. The distance of the recessed portion gap W3 is set based on, for example, the distance that foreign matter can pass through.

Furthermore, the projecting portions 433P are configured such that with the position of the center of the float valve 52 coinciding with the position of the cylindrical center of the cylinder portion 433, the projecting portion gap W4 is, for example, 0.2 mm. Thus, the projecting portion gap W4 has a specific distance so as to make the float valve 52 movable (displaceable) with respect to the cylinder portion 433.

Here, as shown in FIG. 9C, the center of the float valve 52 may be displaced with respect to the cylindrical center of the cylinder portion 433, bringing a part of the float valve 52 into contact with cylinder portion 43.

The projecting portions 433P function so that with the float valve 52 eccentric with respect to the cylinder portion 433, the recessed portion gap W3 of the portion of the float valve 52 which is not in contact with the cylinder portion 433 maintains a specific distance. The specific distance is set based on, for example, a distance which prevents a part of the float valve 52 from falling into the inside of the annular portion 51C of the end cap 51 (toward the center axis of the annular portion 51C). In this manner, the projecting portions 433P adjust the maximum eccentricity of the float valve 52 with respect to the cylinder portion 433. If the float valve 52 becomes eccentric with respect to the cylinder portion 433, the projecting portions 433P function to enable maintenance of the capability of closing (sealing) the second-side end portion 513 of the end cap 51.

In the damping force adjusting section 40 in this example configured as described above, foreign matter may be mixed into the oil for some reason and stuck in between the float valve 52 and the end cap 51, as shown in FIG. 9B.

Here, the projecting portions 433P and the recessed portions 433N serve to form the recessed portion gap W3 between the float valve 52 and the cylinder portion 433. Thus, the foreign matter stuck in between the float valve 52 and the end cap 51 is discharged toward the pressure chamber 47 through recessed portion gap W3.

As described above, even the hydraulic shock absorber 1 with the damping force adjusting section 40 in the above-described example inhibits the foreign matter from being trapped between the float valve 52 and the annular portion 51C or deformation regulating section 51G of the end cap 51.

Moreover, the present embodiment provides the projecting portions 433P on the cylinder portion 433. Thus, as shown in FIG. 9C, even if the center of the float valve 52 is displaced from the cylindrical center of the cylinder portion 433 to make the float valve 52 eccentric, the distance of the recessed portion gap W3 can be set within a given range. The present embodiment sets the recessed portion gap W3 corresponding to the maximum eccentricity equal to the value of a distance preventing a part of the float valve 52 (in the present embodiment, the recessed portions 52N) from slipping into the inside of the annular portion 51C of the end cap 51. Thus, the capability of providing a seal between the float valve 52 and the end cap 51 can be maintained.

The present embodiment integrally forms the projecting portions 52P on the float valve 52 or integrally forms the projecting portions 433P on the piston nut 43 so that with the position of the float valve 52 adjusted with respect to the piston nut 43 (cylinder portion 433), a gap is formed between the float valve 52 and the piston nut 43. However, the present embodiment is not limited to this configuration. For example, members different from these members may be provided between the piston nut 43 and the float valve 52. The different members may be used to form a gap between the float valve 52 and the piston nut 43.

EXPLANATION OF REFERENCE NUMERALS

1 Hydraulic shock absorber
10 Cylinder portion
20 Piston rod
25 Bypass path
30 Piston valve
40 Damping force adjusting section
41 Damping force varying valve
42 Orifice
43 Piston nut
44 Spool
47 Pressure chamber
51 End cap
52 Float valve
52P Projecting portion
52N Recessed portion
60 Bottom valve

What is claimed is:

1. A shock absorber comprising:
  a cylinder containing a liquid;
  a partitioning member partitioning a space in the cylinder into a first liquid chamber and a second liquid chamber which contain the liquid;
  a rod member connected to the partitioning member and moving in an axial direction of the cylinder;
  a channel forming portion forming a channel for the liquid between the first liquid chamber and the second liquid chamber, the liquid flowing through the channel along with a movement of the rod member;

a damping valve member generating a damping force by opening and closing the channel of the channel forming portion;

a damping force changing portion including an inflow portion into which the liquid flows, the damping force changing portion changing the damping force generated by the damping valve member by use of a pressure of the liquid in the inflow portion; and a valve member provided inside the inflow portion, the valve member being deformed or displaced to change the pressure of the liquid in the inflow portion, wherein:

a gap is formed between the valve member and the inflow portion in a radial direction of the valve member;

the valve member includes a projecting portion projecting outward from an outer periphery of the valve member, and the gap is formed between the valve member and an inner periphery of the inflow portion;

the inflow portion includes an annular portion formed in an annular shape and facing the valve member, and the valve member contacts the annular portion; and the projecting portion of the valve member is configured to project such that the projection allows the valve member to seal the annular portion in a state where the valve member is most eccentric in the radial direction.

2. The shock absorber according to claim 1, further comprising:

a bypass path extending from the first liquid chamber to the second liquid chamber, the bypass path allowing the liquid to bypass the channel of the channel forming portion; and a throttle member throttling a flow of the liquid in the bypass path, wherein the inflow portion communicates with the bypass path via the throttle member.

* * * * *